F. CRIST.
WASHOUT PLUG FOR BOILERS.
APPLICATION FILED SEPT. 27, 1918.
1,342,740.
Patented June 8, 1920.
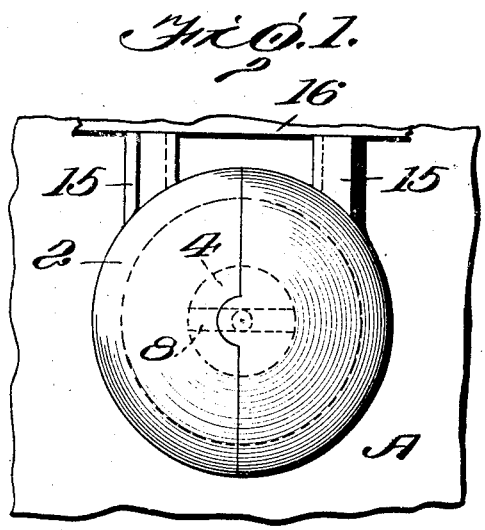
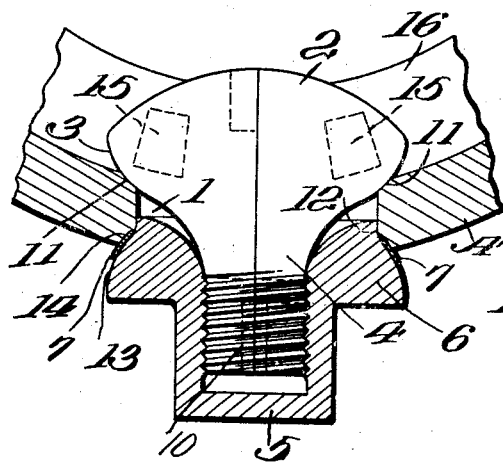 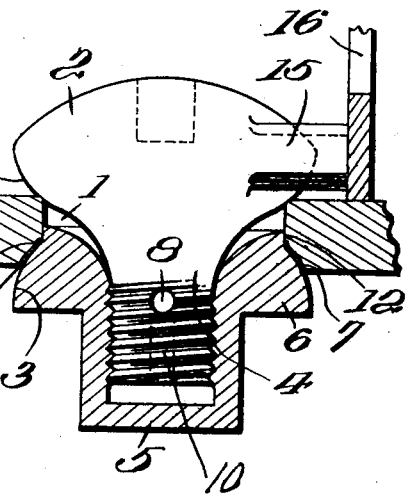
Frank Crist, Inventor

UNITED STATES PATENT OFFICE.

FRANK CRIST, OF LIMA, OHIO.

WASHOUT-PLUG FOR BOILERS.

1,342,740.

Specification of Letters Patent.

Patented June 8, 1920.

Application filed September 27, 1918. Serial No. 255,932.

*To all whom it may concern:*

Be it known that I, FRANK CRIST, a citizen of the United States, and resident of Lima, county of Allen, and State of Ohio, have invented certain new and useful Improvements in Washout-Plugs for Boilers, of which the following is a specification.

This invention relates to an improvement in wash-out plugs for locomotive and other boilers.

The object is to provide a plug which may be applied from the outside of the boiler and without tapping threads in the hole of the boiler, and which will not be liable to be blown out.

The invention consists of a split plug having a rounded or curved engaging surface at its head and tapering down to a threaded shank; and a nut is screwed onto the shank and is provided at its inner end with an enlarged annular portion adapted to engage the exterior surface of the boiler around the opening therein, and cause the rounded surface of the plug to be drawn into contact with the inner surface of the boiler for closing the opening.

The invention consists of certain novel features of construction and combinations of parts which will be hereinafter described and pointed out in the claims.

In the accompanying drawings:—

Figure 1 is a view in top plan, looking down from the top of the plug;

Fig. 2 is a vertical sectional view through a portion of the boiler and nut, and showing the plug in elevation; and Fig. 3 is a similar view taken at right angles to that shown in Fig. 2.

In the drawings, A, represents the boiler and 1 the wash-out hole or opening.

A plug 2, preferably made in two sections, is adapted to be received in the opening 1. The head of the plug is rounded as at 3, and this rounded surface engages the surface of the boiler A around the opening for forming a closure. The plug tapers from the rounded portion down to a shank 4 which is screw-threaded, and upon the screw-threaded portion a nut 5 is screwed.

The inner end of the nut 5 is enlarged as at 6, and the inner surface is flared to conform to the flared or curved surface of the plug, so that the nut may be screwed upon the plug to draw it tightly against the boiler. The outer surface of the enlarged portion 6 of the nut engages the outer wall of the boiler around the opening 1. A copper gasket 7 is placed between the nut and boiler so that as the nut is screwed onto the plug, the head of the plug and nut are drawn tightly against the walls of the boiler for forming a tight joint.

Referring to Fig. 2, it is to be noted that the boiler is at two diametrically opposite points beveled or counter-sunk as at 11, to produce an engaging surface on the wall of the boiler for the rounded or curved surface 3 of the plug 2 entirely around the opening.

The enlarged portion 6 of the nut 5 has at the outer end an annular straight edge engaging surface 12, and from this surface the enlarged portion is rounded as at 13. The annular portion 12 will engage with the straight edge portion of the wall of the opening 1 and the rounded surface 13 of the nut will engage the beveled or counter-sunk portion 14 of the wall of the opening 1, so that as the nut is screwed upon the shank 4 of the plug 2 the engaging surface of the plug and nut will engage the inner and outer surfaces of the boiler around the opening and produce a tight ball joint.

In the application of the plug to the boiler, one section is inserted through the opening and then the other, and after both sections are in place, a pin 8 is inserted in a hole 9 formed in the shanks of the two sections for holding them together. To eliminate any wabbling of the two sections and to aline the threads of the shank 4 before applying the nut 5 to the shank a pin may be inserted in the opening 10 formed in the shank.

The plug 2 is provided with lugs or projections 15 adapted to engage the mud ring 16 of the boiler for holding the plug against rotation as the nut is screwed thereon.

It is evident that many slight changes may be made in the form and arrangement of parts described without departing from the spirit and scope of the invention and hence I do not wish to be limited to the exact construction herein set forth.

Having described my invention what I claim as new and desire to secure by Letters Patent, is:—

1. A wash-out plug for boilers, comprising a boiler having an opening, a sectional plug having a rounded head for engaging the wall of the boiler around the opening, and a nut having screw-threaded engagement with the plug for drawing it to its seat, said nut having an enlarged portion adapted as the nut is screwed onto the plug to engage the opposite wall of the boiler around the opening.

2. A wash-out plug for boilers, comprising a boiler having an opening, a plug having a rounded head for engaging the wall of the boiler around the opening, and a nut having screw-threaded engagement with the plug for drawing it to its seat, said nut having an enlarged portion provided with an annular straight edge portion adapted to engage the wall of the opening and a curved portion extending from said straight edge portion for engaging the outer wall of the boiler around the opening for closing the opening.

3. A wash-out plug for boilers comprising a boiler having an opening, a plug made in sections having a rounded head for engaging the wall of the boiler around the opening, said sections being provided with a hole, a pin passing through the hole in the sections of the plug for holding them in position, and a nut mounted on said plug and adapted to engage the opposite wall of the boiler around the opening for closing said opening.

FRANK CRIST.